(12) United States Patent
Rodgers et al.

(10) Patent No.: US 11,780,263 B2
(45) Date of Patent: Oct. 10, 2023

(54) HYBRID METAL AND COMPOSITE POLYMER WHEELS FOR MOTOR VEHICLES

(71) Applicant: GM GLOBAL TECHNOLOGY OPERATIONS LLC, Detroit, MI (US)

(72) Inventors: William R. Rodgers, Bloomfield Township, MI (US); Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 391 days.

(21) Appl. No.: 17/090,306

(22) Filed: Nov. 5, 2020

(65) Prior Publication Data

US 2022/0134801 A1      May 5, 2022

(51) Int. Cl.
   *B60B 5/02*       (2006.01)
   *B60B 21/04*     (2006.01)
   (Continued)

(52) U.S. Cl.
   CPC ............... *B60B 5/02* (2013.01); *B29C 70/48* (2013.01); *B29C 70/747* (2013.01); *B60B 1/14* (2013.01);
   (Continued)

(58) Field of Classification Search
   CPC ........ B60B 2360/102; B60B 2360/104; B60B 2360/106; B60B 2360/108;
   (Continued)

(56) References Cited

U.S. PATENT DOCUMENTS

| 2,439,881 | A | * | 4/1948 | Ash | ......................... B60B 3/087 |
| | | | | | 301/65 |
| 3,250,571 | A | * | 5/1966 | Richter | ..................... B60B 3/06 |
| | | | | | 29/894.342 |

(Continued)

FOREIGN PATENT DOCUMENTS

| CN | 2456929 Y | * | 10/2001 |
| CN | 110561967 A | * | 12/2019 |

(Continued)

*Primary Examiner* — Kip T Kotter
(74) *Attorney, Agent, or Firm* — Quinn IP Law

(57) ABSTRACT

Presented are hybrid metal and fiber-reinforced polymer (FRP) composite wheels for vehicle wheel assemblies, methods for making/using such wheels, and motor vehicles equipped with such wheels. A wheel for a motor vehicle wheel assembly includes a wheel face with multiple spokes that are circumferentially spaced about and project radially outward from a central hub. The central hub rotatably attaches to the vehicle's body, e.g., via a corner module. The wheel face is fabricated, e.g., as a one-piece structure, from an FRP material. A wheel barrel, which circumscribes the wheel face, includes an annular rim that mounts thereon an inflatable tire. The wheel barrel is fabricated, e.g., as a one-piece structure, from a metallic material. Multiple overmold through holes and/or inset tabs are circumferentially spaced about the annular rim. The FRP material extends through and/or surrounds the overmold through holes/inset tabs and thereby mounts the wheel face to the wheel barrel.

20 Claims, 3 Drawing Sheets

(51) Int. Cl.
*B29C 70/48* (2006.01)
*B29C 70/74* (2006.01)
*B60B 1/14* (2006.01)
*B60B 3/04* (2006.01)
B29K 705/12 (2006.01)
B60B 27/02 (2006.01)
B29K 307/04 (2006.01)
B29L 31/32 (2006.01)
B29K 63/00 (2006.01)
B29K 105/08 (2006.01)
B29K 705/02 (2006.01)

(52) U.S. Cl.
CPC .............. *B60B 3/042* (2013.01); *B60B 3/045* (2013.01); *B60B 21/04* (2013.01); *B29K 2063/00* (2013.01); *B29K 2105/0845* (2013.01); *B29K 2307/04* (2013.01); *B29K 2705/02* (2013.01); *B29K 2705/12* (2013.01); *B29L 2031/32* (2013.01); *B60B 27/02* (2013.01); *B60B 2310/204* (2013.01); *B60B 2310/302* (2013.01); *B60B 2360/102* (2013.01); *B60B 2360/104* (2013.01); *B60B 2360/106* (2013.01); *B60B 2360/108* (2013.01); *B60B 2360/341* (2013.01); *B60B 2360/3412* (2013.01); *B60B 2360/3416* (2013.01); *B60B 2360/3418* (2013.01); *B60B 2360/368* (2013.01); *B60B 2900/111* (2013.01); *B60B 2900/112* (2013.01); *B60B 2900/311* (2013.01)

(58) Field of Classification Search
CPC ...... B60B 2360/341; B60B 2360/3412; B60B 2360/3416; B60B 2360/3418; B60B 2360/368; B60B 3/04; B60B 3/041; B60B 3/042; B60B 3/044; B60B 3/045; B60B 3/047; B60B 2310/204; B60B 2310/302; B60B 5/02; B60B 1/14; B60B 21/04; B60B 27/12; B60B 27/02; B29C 70/48; B29C 70/747; B29K 2063/00; B29K 2307/04; B29L 2705/02; B29L 2705/12; B29L 2031/32
See application file for complete search history.

(56) References Cited

U.S. PATENT DOCUMENTS

| | | | |
|---|---|---|---|
| 5,581,468 A | 12/1996 | White et al. | |
| 5,899,538 A * | 5/1999 | Tatraux-Paro | B60B 23/00 |
| | | | 301/63.101 |
| 7,819,462 B1 | 10/2010 | Owens | |
| 8,033,592 B2 | 10/2011 | Hsu et al. | |
| 8,109,492 B2 | 2/2012 | Winocur | |
| 8,309,644 B1 | 11/2012 | Huang | |
| 8,481,170 B2 | 7/2013 | Vanimisetti et al. | |
| 8,662,599 B2 | 3/2014 | Liao et al. | |
| 8,961,724 B2 | 2/2015 | Polewarczyk et al. | |
| 9,227,673 B2 | 1/2016 | Berger et al. | |
| 9,399,490 B2 | 7/2016 | Aitharaju et al. | |
| 9,415,628 B2 | 8/2016 | Kia et al. | |
| 9,650,003 B2 | 5/2017 | Owens et al. | |
| 9,919,554 B2 * | 3/2018 | Taylor | B60B 3/001 |
| 10,279,622 B2 | 5/2019 | Hendel et al. | |
| 2006/0106147 A1 | 5/2006 | Fasulo et al. | |
| 2006/0199890 A1 | 9/2006 | Fasulo et al. | |
| 2007/0063393 A1 | 3/2007 | Vernin et al. | |
| 2007/0299185 A1 | 12/2007 | Ottaviani et al. | |
| 2010/0098925 A1 | 4/2010 | Fasulo et al. | |
| 2010/0320831 A1 * | 12/2010 | Su | B60B 21/062 |
| | | | 301/95.103 |
| 2011/0121225 A1 | 5/2011 | Posudievsky et al. | |
| 2012/0213997 A1 | 8/2012 | Wang et al. | |
| 2018/0029316 A1 | 2/2018 | Coppola et al. | |
| 2018/0030922 A1 | 2/2018 | Kia et al. | |
| 2018/0030923 A1 | 2/2018 | Coppola et al. | |
| 2018/0030924 A1 | 2/2018 | Coppola et al. | |
| 2018/0031027 A1 | 2/2018 | Coppola et al. | |
| 2018/0169975 A1 | 6/2018 | Aitharaju et al. | |

FOREIGN PATENT DOCUMENTS

| | | | | |
|---|---|---|---|---|
| DE | 102016214379 A1 * | 2/2018 | ............. | B60B 23/06 |
| JP | S59195401 A * | 11/1984 | | |
| KR | 101829221 B1 * | 2/2018 | | |

* cited by examiner

HYBRID METAL AND COMPOSITE POLYMER WHEELS FOR MOTOR VEHICLES

INTRODUCTION

The present disclosure relates generally to wheel assemblies for motor vehicles. More specifically, aspects of this disclosure relate to hybrid metal-composite polymer wheel structures for vehicle wheel assemblies.

Current production motor vehicles, such as the modern-day automobile, are originally equipped with a powertrain that operates to propel the vehicle and power the vehicle's onboard electronics. In automotive applications, the powertrain is generally typified by an engine and/or motor that deliver(s) driving torque through an automatic or manually shifted transmission to the vehicle's final drive system (e.g., differential, axle shafts, road wheels, etc.). During vehicle operation, a steering system allows the driver to maintain a desired course for the vehicle and to control the vehicle's directional changes. The steering system includes a hand-operated steering wheel that is mounted via a central hub to a steering column assembly. Telescoped shafts of the steering column connect the steering wheel with a road wheel steering mechanism, most commonly a rack-and-pinion steering architecture. When the steering wheel is rotated, a pinion gear at the distal end of a steering shaft concurrently spins, affecting a linear gear bar, known as a "rack," to move transversely across the vehicle. A tie rod at each end of the rack is connected to the steering arm of a wheel's spindle; the moving rack and tie rod pivot the spindle to turn the wheel.

For most automotive drivelines, a vehicle wheel assembly is a pneumatic unit with a synthetic-rubber tire fitted onto the outer rim (or "barrel") of a metallic wheel. To ensure consistent road handling, steering, and braking, each wheel unit is connected, e.g., via spokes and a central hub (collectively "wheel face"), to the vehicle chassis through a suspension system composed of a collaboration of springs, shock absorbers, and linkages. For instance, a front corner module of a conventional rear-wheel drive automobile employs a steering knuckle with a spindle onto which a hub and a brake rotor are rotatably mounted. Inboard contact points of the knuckle are coupled to the vehicle body, e.g., via a control arm, sway bar, strut damper, and tie rod, whereas the outboard end is coupled to the wheel hub, e.g., via the spindle and hub. The wheel unit rotates and steers on the knuckle, spindle and tie rod, while being held in a stable plane of motion by the knuckle, strut and control arm.

The vast majority of vehicle wheels—the barrel and face—are cast or forged as a single-piece construction from high-strength steel or aluminum alloy due to the metals' durability, thermal stability, and ease of refinish/repair. Metal wheels, however, are relatively heavy and use comparatively expensive raw materials, driving increases to gross vehicle weight and costs. To offset part costs and weight, some high-performance vehicle wheels are now molded entirely from fiber-reinforced polymer (FRP) composite materials. While these FRP wheels structures are significantly lighter with reduced rotational mass, they lack the impact resistance, durability, and repairability of their metal counterparts. In an attempt to secure advantages from both metallic and polymeric designs, original equipment and aftermarket manufacturers have proposed mixed material designs with a hybrid metal-composite polymer wheel structure. Most hybrid metal-composite polymer wheels are bipartite constructions with an all-metal wheel face and a composite polymer barrel. Typically, the wheel face and barrel are joined using metallic fasteners for connecting radially outer ends of the wheel spokes to an inner periphery of the rim.

SUMMARY

Presented herein are hybrid metal-composite polymer wheels for vehicle wheel assemblies, methods for making and methods for using such wheels, and motor vehicles with corner modules utilizing such wheel structures. By way of illustration, there are presented impact-resistant hybrid metal-composite polymer wheels with an all-metal barrel that circumscribes and mounts to a carbon fiber reinforced polymer (CFRP) face. Optional wheel designs employ spokes with cavities or hollow stiffening sections that are reinforced with metal inserts. The barrel and face may be joined using adhesives (e.g., advanced epoxy, silicone, and cyanoacrylate plastic-to-metal adhesive systems) and mechanical fasteners (e.g., countersunk self-aligning titanium lugs). Use of a suitable adhesive—alone or in conjunction with fasteners—helps to preclude potential corrosion at the interface between the composite polymer face and metallic barrel structure. Alternatively, the wheel face may be overmolded onto the barrel, e.g., as part of a combination flow-form and high-pressure resin transfer molding (RTM) process. In this regard, dedicated through holes or inset tabs may be machined in or welded to the barrel; during overmolding, the polymer flows through and surrounds the holes/tabs to reinforce the resultant mechanical joint.

Attendant benefits for at least some of the disclosed concepts include a hybrid wheel structure that offers the weight-to-strength benefits of a continuous CFRP hub-and-spoke face in the stiffness-dominated section of the wheel, and the ductility, durability, and thermal stability of a metallic rim in the impact-prone barrel section of the wheel. This construction provides mass reduction without sacrificing barrel flange impact performance. Additional benefits are offered in the carbon fiber composite aesthetic appearance of the wheel face. The mixed-material wheel configuration provides for increased freedom in styling of the outer A-side appearance of the wheel unit, while maintaining sufficient radial and transverse wheel stiffness to prevent unwanted deformation during external loading.

Presented herein are hybrid metal-composite polymer wheels for vehicle wheel assemblies. In an example, there is presented a wheel for a wheel assembly of a motor vehicle. The wheel assembly includes, among other things, an inflatable polymeric tire, and the motor vehicle includes, among other things, a vehicle body. The wheel includes a wheel face typified by multiple elongated spokes that are circumferentially spaced about and project radially outward from a disc-shaped central hub. The central hub rotatably attaches to the vehicle body, e.g., via a front or rear corner module. The wheel face is fabricated, in whole or in part, from a fiber-reinforced polymer (FRP) material, such as CFRP. The wheel also includes a wheel barrel that is coaxial with and circumscribes the wheel face. The wheel barrel is typified by an annular rim that mounts thereon the tire. The wheel barrel is fabricated, in whole or in part, from a metallic material, such as steel or aluminum alloy. A series of overmold through holes and/or inset tabs is circumferentially spaced about the annular rim. To rigidly mount the wheel face to the wheel barrel, the FRP material of the spokes extends through and/or surrounds the dedicated overmold through holes/inset tabs.

Additional aspects of this disclosure are directed to motor vehicles equipped with hybrid metal-composite polymer wheels. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft trailers, aircraft, etc. In an example, a motor vehicle includes a vehicle chassis with multiple road wheels and other standard original equipment. Mounted on the vehicle chassis is an electric traction motor and/or an internal combustion engine that operate, independently or collectively, to selectively drive one or more of the road wheels to thereby propel the vehicle.

Continuing with the discussion of the above example, the vehicle also includes a wheel assembly that is located within a wheel well of the vehicle body. The wheel assembly includes an inflatable tire, a wheel face, and a wheel barrel. The wheel face has a disc-shaped central hub that is integrally formed with multiple elongated spokes. These spokes are circumferentially spaced about and project radially outward from the central hub. The central hub rotatably attaches to the vehicle body, e.g., via a spindle and knuckle. The wheel face is fabricated, in whole or in part, from an FRP material. The wheel barrel, which is coaxial with and circumscribes the wheel face, has an annular rim that mounts thereon the tire. The wheel barrel is fabricated, in whole or in part, from a metallic material. A series of dedicated overmold through holes and/or inset tabs is circumferentially spaced about the annular rim. The FRP material of the spokes extends through and/or surrounds the overmold through holes/inset tabs to thereby mount the wheel face to the wheel barrel.

Also presented herein are methods for using and methods for constructing any of the disclosed vehicle wheels, wheel assemblies, and motor vehicles. In an example, a method is presented for manufacturing a wheel for a wheel assembly of a motor vehicle. This representative method includes, in any order and in any combination with any of the above and below described options and features: forming a wheel barrel from a metallic material, the wheel barrel including an annular rim configured to mount thereon an inflatable tire; adding, to the wheel barrel, a series of overmold through holes and/or a series of overmold inset tabs circumferentially spaced about the annular rim; and overmolding, onto the wheel barrel, a wheel face from a fiber-reinforced polymer material such that the FRP material extends through/surrounds the overmold through holes and/or inset tabs and thereby mounts the wheel face to the wheel barrel, the wheel face including multiple spokes circumferentially spaced about and projecting radially from a central hub, the central hub being configured to rotatably attach to the vehicle body.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
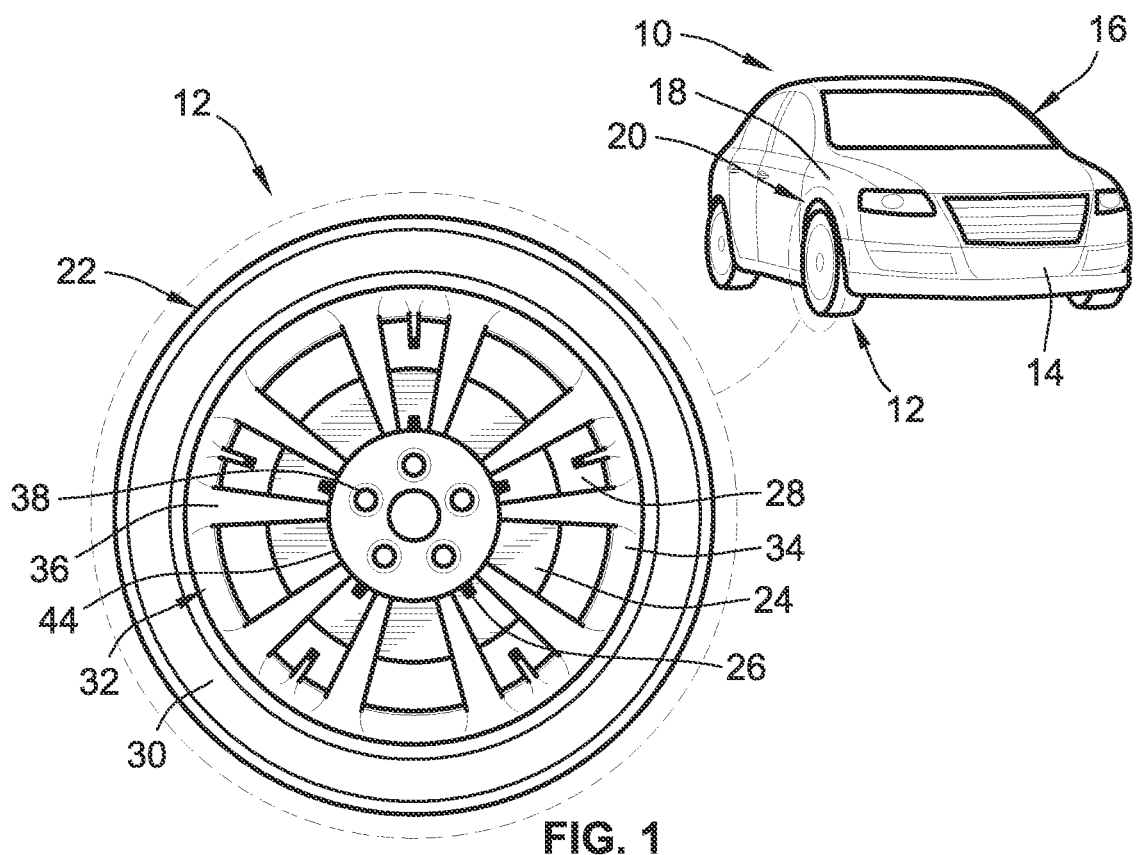
FIG. 1 is a front, perspective-view illustration of a representative motor vehicle with an inset view of a representative wheel assembly including a hybrid metal-composite polymer wheel in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as a three-box, sedan-style passenger vehicle. Mounted at a forward portion of the automobile 10, e.g., aft of a front bumper fascia 14 and forward of a passenger compartment 16, is a front corner module 12, which is wholly or partially positioned within a wheel well that is defined in part by a front fender panel 18 of the vehicle's body 20. The illustrated automobile 10—also referred to herein as "motor vehicle" or "vehicle" for short—is merely an exemplary application with which novel facets of this disclosure may be practiced. In the same vein, implementation of the present concepts for a front corner module of an automobile should also be appreciated as an exemplary application of the novel concepts disclosed herein. As such, it will be understood that many aspects and features of the present disclosure may be applied to other wheel assemblies and may be incorporated into any logically relevant type of motor vehicle. Lastly, the drawings discussed herein are not necessarily to scale and are provided purely for instructional purposes. Thus, the specific and relative dimensions shown in the drawings are not to be construed as limiting.

With reference to both the enlarged and inset views of FIG. 1, the front corner module 12 includes front suspension, steering and braking system components for connecting the wheel assembly 22 to the vehicle body 20 within the wheel well of the fender 18. These suspension, steering and braking systems may take on any commercially available or hereafter developed architectures, including: electromagnetic, hydraulic, and friction (drum or disc) brake system configurations; mechanical, power-assisted, and by-wire vehicle steering system configurations; and independent or dependent, active or passive, leaf spring, twist-beam, or coil spring, wishbone, trailing-arm or multi-link suspension system configurations, etc. The suspension, steering, and braking systems of FIG. 1 are generally represented by a brake rotor 24 of a front disc brake assembly and an axle hub-and-bearing assembly 26 of an independent "wishbone" front suspension. A dust cover (or "splash shield") 28 is interposed between the brake rotor 24 and a knuckle, spindle, strut, etc., (not visible) of the steering and suspension systems to protect these components from road debris, ice, water, etc.

Wheel assembly 22 of FIG. 1 is generally composed of a composite synthetic-rubber tire 30 that circumscribes a hybrid metal-composite polymer wheel, designated generally at 32. Irrespective of tire type, whether it be all-season, all-terrain, off-road, low profile, snow, mud, etc., the tire 30 may take on a multilayer toroidal form with an outer tread that increases traction and, thus, vehicle handling. A typical pneumatic radial tire, for example, includes a rubber tread overlaying metallic belts, cap and radial plies, and a main carcass with inextensible beads that seal to the outer perimeter of the wheel 32. The tire 30 may be provided with a conventional Schrader-type check valve for regulating tire pressure. As is common, the tire 30 may mount directly onto the wheel 32 structure and hold air without the need for a separate inner tube.

To manage external loading conditions, such as a shallow offset frontal load, and concomitantly control deflection of the front corner assembly 12 during such loading, the wheel 32 is constructed as a hybrid wheel comprised of a metallic barrel 34 that is attached to a fiber-reinforced polymer (FRP) composite wheel face 36. This configuration offers the advantages of rigidity and high strength-to-weight ratio of FRPs in stiffness-dominated regions of the wheel, and the ductility and robustness of metal in the impact-prone regions of the wheel. In a non-limiting example, the wheel barrel 34 of FIG. 1 may be a unitary cast or forged weldment formed entirely from a metallic material, such as aluminum 356 alloy for a cast weldment and aluminum 6061 or aluminum 5454 alloy for a forged weldment, and the wheel face 36 may be fabricated entirely from an FRP material, such as a woven carbon fiber layup embedded in a thermoset epoxy resin matrix. The wheel 32 and, thus, the wheel assembly 22 is mounted via a circular array of lug nuts 38 onto complementary studs of the hub-and-bearing assembly 26 for common rotation with the rotor 24. It should be appreciated that the aesthetic characteristics, as well as the individual and relative dimensions of the constituent parts of the wheel assembly 22 may vary from that which are shown in the drawings.

Figure 2:
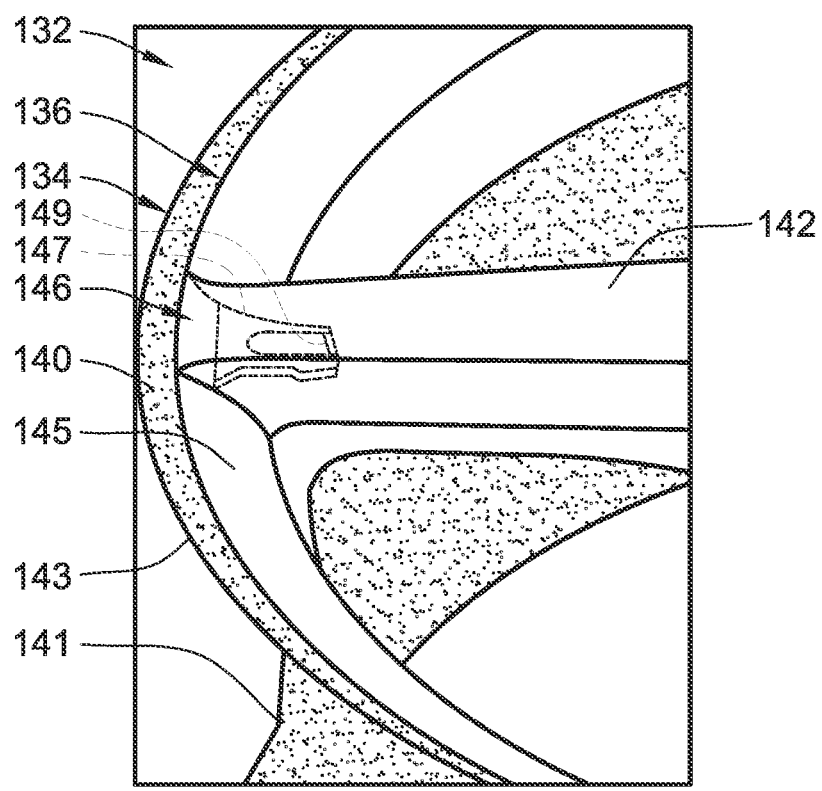
FIG. 2 is an enlarged, perspective view illustration of a portion of a representative overmolded hybrid metal-composite polymer wheel with dedicated overmold inset tabs in accordance with aspects of the present disclosure.
Figure 4:
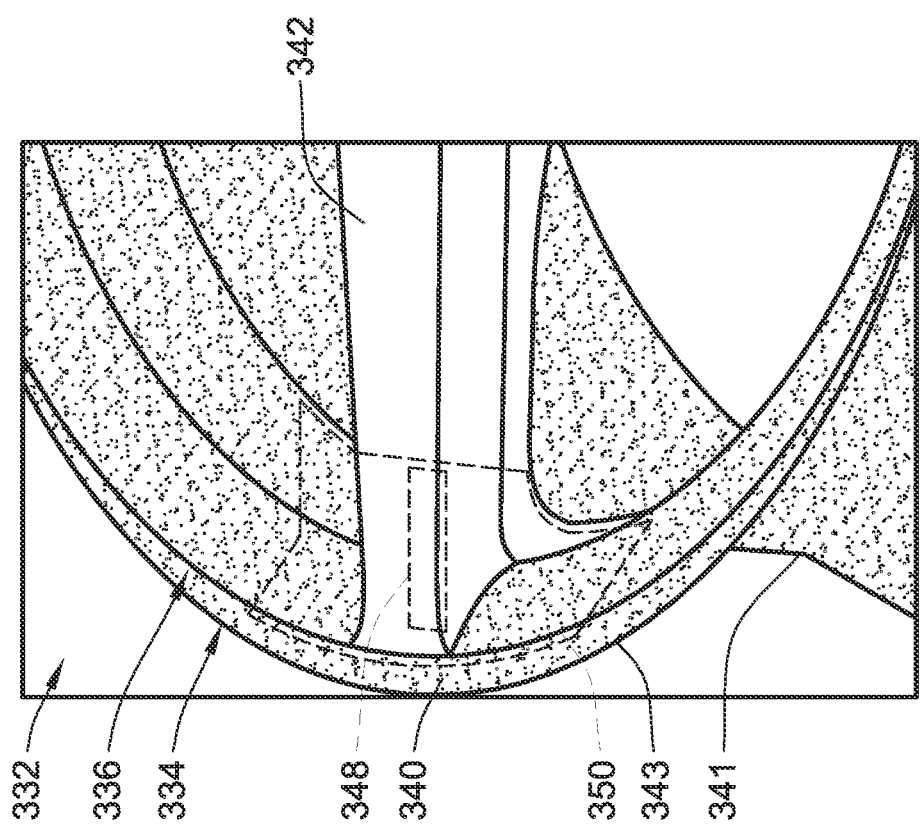
FIG. 4 is an enlarged, perspective view illustration of a portion of yet another representative overmolded hybrid metal-composite polymer wheel with dedicated overmold through holes and spoke-reinforcing FRP backing plates in accordance with aspects of the present disclosure.
Figure 3:
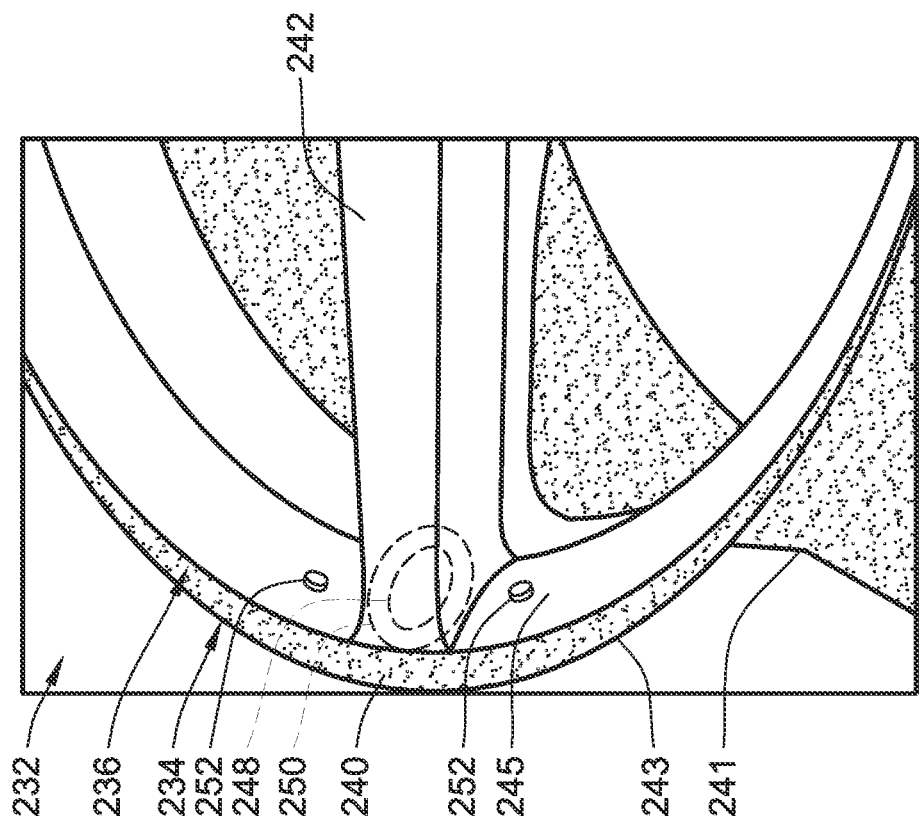
FIG. 3 is an enlarged, perspective view illustration of a portion of another representative overmolded hybrid metal-composite polymer wheel with dedicated overmold through holes in accordance with aspects of the present disclosure.

Turning next to FIGS. 2-4, there are shown different examples of hybrid metal-composite polymer wheels 132, 232 and 332 in accord with aspects of the disclosed concepts. While differing in appearance, it is envisioned that the features and options disclosed herein with reference to the wheel 32 and wheel assembly 22 of FIG. 1 may be incorporated, singly or in any combination, into the wheels 132, 232, 332 of FIGS. 2-4, and vice versa. As a point of similarity to the above-described wheel 32, each wheel 132, 232, 332 structure may be a bipartite construction composed of a metal wheel barrel 134, 234, and 334 that is mounted onto a fiber-reinforced polymer wheel face 136, 236, and 336, respectively. Similar to barrel 34 of FIG. 1, each wheel barrel 134, 234, 334 has a toroidal shape with an annular rim 140, 240, and 340, respectively, that is concentric with and surrounds the wheel face 136, 236, 336. The wheel barrel rim 140, 240, 340 sealingly mounts thereon an inflatable polymeric tire, such as tire 30 of FIG. 1. Comparable to the wheel face 36 of FIG. 1, the wheel faces 136, 236, 336 have hub-and-spoke geometries with a series of spokes 142, 242, and 342 that is circumferentially spaced equidistantly around, and project radially outward from, a central hub (e.g., wheel hub 44 of FIG. 1). As noted above, the hub 44 rotatably attaches the wheel 32 to the vehicle body 20.

Wheel barrels 134, 234, 334 of FIGS. 2-4 are each fabricated, in whole or in part, from a metallic material, such as aluminum, steel, magnesium, titanium, alloys thereof combinations thereof, etc. It may be desirable, for at least some vehicular applications, that the wheel barrel 134, 234, 334, including the annular rim 140, 240, 340, is fabricated entirely from the metallic material as a one-piece, unitary structure. As shown, an annular rim 140, 240, 340 may be typified by a contoured rim well 141 with a pair of ring-shaped rim flanges 143 that project radially outwards from opposing edges of the well 141. Contrastingly, the wheel faces 136, 236, 336 are each fabricated, in whole or in part, from an FRP material, such as glass, carbon, aramid, boron, metal, basalt fibers, combinations thereof, etc., that are embedded within a thermoset or thermoplastic polymer matrix. It may be desirable, for at least some vehicular applications, that the wheel face 136, 236, 336, including the spokes 142, 242, 342 and central hub 44, is fabricated entirely from the FRP material as a one-piece, unitary structure. As shown in FIGS. 2 and 3, a wheel face 136, 236 may incorporate an annular spoke rim 145 and 245, respectively, that is concentric with the central wheel hub 44. In this instance, the spokes 142, 242 extend between and connect the spoke rim 145, 245 with the central hub 44. Optionally, the spoke rim 145, 245 is coaxially aligned with the wheel barrel 134, 234, seated substantially flush against the radially inner periphery of the annular rim 140, 240.

To rigidly secure the wheel faces 136, 236, 336 to their respective barrels 134, 234, 334, the spokes 142, 242, 342 and hub 44 may be overmolded onto the annular rim 140, 240, 340, as will be described in extensive detail below in the discussion of FIG. 5. Rather than merely cover, coat, and/or overlay a metallic skeletal spoke-and-hub structure with a polymer or an FRP material, the wheel faces 136, 236, 336 of FIGS. 2-4 are fabricated via a manufacturing technique that is similar to a multi-shot injection molding process, replacing the first shot of a traditional two-shot mold procedure with the insertion of the metallic barrel 134, 234, 334 into the mold cavity. To increase the strength of the resultant connection between the two parts, one or more overmold through holes and/or inset tabs are added to the annular rim 140, 240, 340 to generate mechanical joints between the barrel 134, 234, 334 and face 136, 236, 336 during the molding process. For instance, a circular array of overmold inset tabs 146 is circumferentially spaced about the barrel 134 of FIG. 2, e.g., with a discrete inset tab 146 dedicated to a corresponding companion spoke 142. Each of the overmold inset tabs 146 includes an elongated body 147 with a through hole 149 that extends through the body 147. A radially outermost (proximal) end of the overmold inset tab's 146 elongated body 147 is integrally formed with, welded to, or otherwise mounted on a radially inner surface of the annular rim 140 such that the tab 146 projects radially inward from the annular rim 140. Each overmold inset tab 146 is embedded within the FRP material of a respective one of the spokes 142 and the annular spoke rim 145. In so doing, the overmold inset tab bodies 147 are encased inside solidified FRP material, with FRP material entrenched in the through holes 149 of the tab bodies 147.

As a non-limiting point of demarcation over the wheel 132 structure of FIG. 2, wheels 232, 332 of FIGS. 3 and 4 are fabricated with a circular array of overmold through holes 248, 348, respectively, that extend through the annular rims 240, 340. These through holes 248, 348 are circumferentially spaced about the barrels 234, 334, e.g., with a discrete through hole 248, 348 dedicated to a corresponding one of the spokes 242, 342. FRP through holes 248 of FIG. 3 have an elliptical or circular shape, whereas the FRP through holes 348 of FIG. 4 have a rectangular or polygonal shape. During the assembly of the wheel face to the barrel prior to the overmolding operation, flaps of the fiber reinforcement may be passed through these holes to reside in the rim well 241, 341 on the tire side of the wheel. During molding, the FRP material of the wheel face 236, 336 flows through and surrounds the overmold through holes 248, 348. For instance, each overmold through hole 248 of FIG. 3, which extends through the annular rim 240, receives therethrough the FRP material of a respective spoke 242. Once solidified, the FRP material of the wheel face 236 forms an integral mushroom-shaped rivet 250 that seats between the well flanges 243 and abuts the rim well 241. As another option, the overmold through holes 348 of FIG. 4 each receives therethrough the FRP material of a respective one of the spokes 342. Once solidified, the FRP material of the wheel face 336 forms an integral rectangular-shaped backing plate 350 that seats between the well flanges 343 and abuts the rim well 341. For at least some implementations, approximately 10% to 25%, or more, of fibers contained within the FRP material of the wheel face 236, 336 is located inside the rim well 241, 341. In addition to, or as an alternative for, the resultant FRP rivets 250 and/or backing plates 350, one or more mechanical fasteners 252 may be circumferentially spaced about the annular rim 240, fastening the spokes 242 of the wheel face 236 to the wheel barrel 234.

Figure 5:
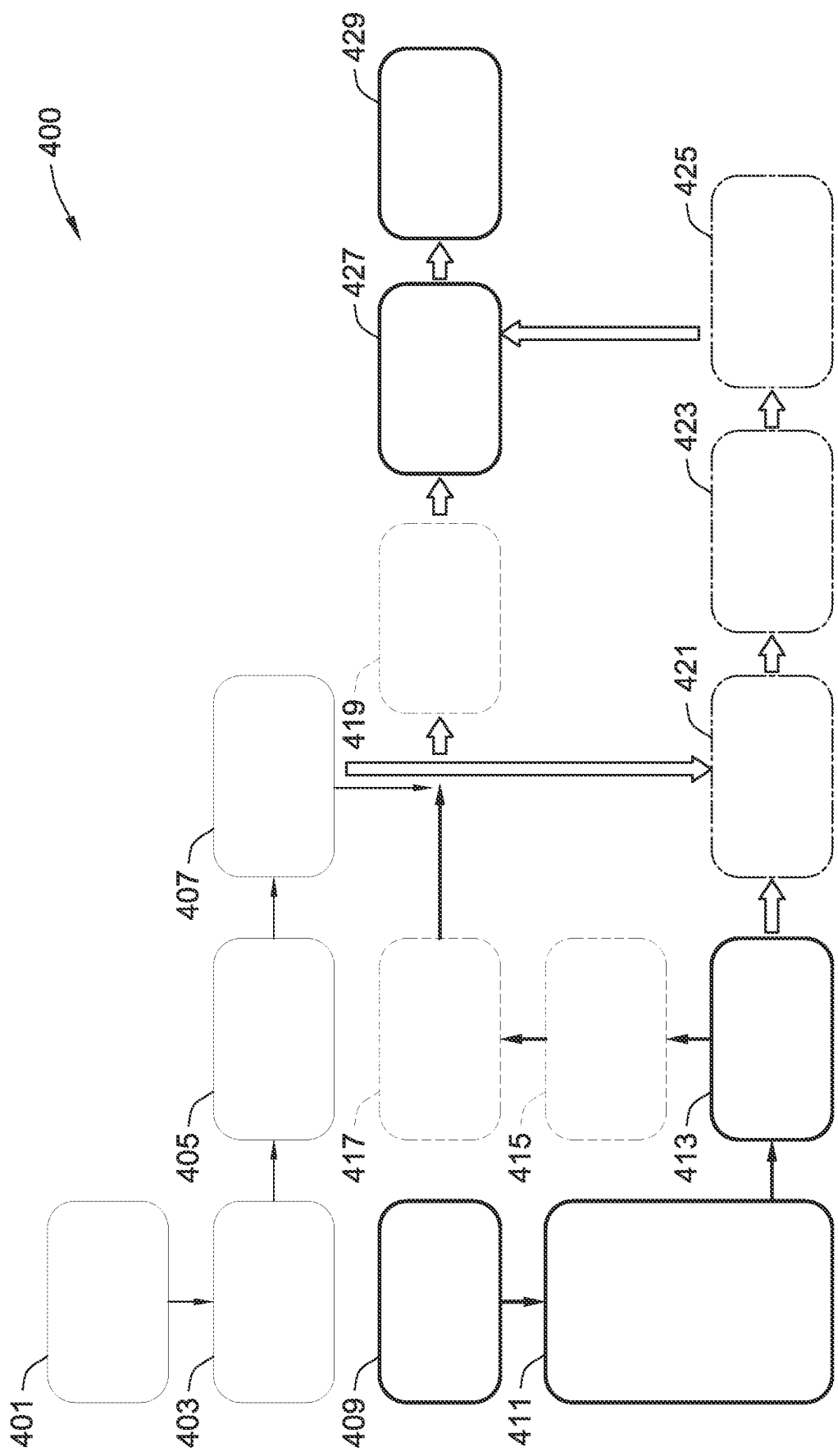
FIG. 5 is a flowchart illustrating an example workflow process for manufacturing hybrid metal-composite polymer vehicle wheels, some or all of which may correspond to memory-stored instructions executed by a resident or remote system controller, control-logic circuitry, programmable electronic control unit, or other integrated circuit device or network of devices in accord with aspects of the disclosed concepts.

With reference now to the flowchart of FIG. 5, an improved method or control strategy for manufacturing a hybrid metal-composite polymer wheel, such as wheels 32, 132, 232, 332 of FIGS. 1-4, for a wheel assembly of a motor vehicle, such as wheel assembly 22 of automobile 10 of FIG. 1, is generally described at 400 in accordance with aspects of the present disclosure. Some or all of the operations illustrated in FIG. 5, and described in further detail below, may be representative of an algorithm that corresponds to processor-executable instructions stored, for example, in main or auxiliary or remote memory, and executed, for example, by a resident or remote system controller, processing unit, control logic circuit, or other module, device, or network of devices, to perform any or all of the above and below described functions associated with the disclosed concepts. It should be recognized that the order of execution of the illustrated operations may be changed, additional operations may be added, and some of the operations described may be modified, combined, or eliminated.

Method 400 may begin at process block 401 with forging, rolling, casting, or spinning a select metallic material into a predefined part blank. For instance, ingots or billets of steel may be hot forged into a ring-shaped part blank. The metal blank is thereafter transferred to a suitable flow-forming station, where it may be mounted onto a mandrel and incrementally shaped via rollers or forming die into a metallic barrel, as indicated at process block 403. It is envisioned that other metalworking techniques may be employed for forming the part blank to a desired shape. It is also envisioned that the metallic barrel may be cast from an appropriate metal alloy. The casting may be high precision die casting, vacuum assisted die casting, investment casting or other appropriate casting technique.

The method 400 thereafter advances to process block 405 to perform final precision machining and post-processing operations on the formed barrel, such as trimming, beveling, sand blasting, cleaning, etc. Process block 405 may further include fabricating a set of dedicated overmold through holes and/or inset tabs into the barrel. The dedicated overmold inset tabs may be fabricated separately, positioned in a predefined pattern about the barrel (i.e., to engage the wheel spokes), and subsequently welded or fastened to the flow formed barrel. Optionally or alternatively, a predefined pattern of overmold through holes may be drilled, cut, or punched through the barrel such that fabric reinforcements and/or fibers from the wheel face's FRP material can pass through these holes and spread onto the wheel well of the barrel. The method 400 then advances to process block 407 to powder coat, plate, chrome, clear coat, and/or paint the barrel.

Prior to, contemporaneous with, or after performing the manufacturing operations set forth in process blocks 401 to 407, method 400 executes process block 409 and receives, retrieves, or produces (collectively "procure") the fibers needed to form the FRP-based sections of the wheel unit. For instance, chopped carbon fiber of a select diameter and length may be procured from a suitable supplier. The fibers may be processed into a woven fabric or non-crimp fabric or, if desired, a mixture of both, e.g., for desired appearance and physical properties. Optionally, the fibers may be procured as a prepreg composite in which the fibers are impregnated with an uncured resin. Method 400 thereafter advances to process block 411 and prepares a hub-and-spoke preform from the fibers procured at process block 409. By way of non-limiting example, a fabric lay-up, tailored fiber placement, or filament winding is prepared into a preform of a desired size and shape. This step enables the ability add hollow cores to the preform (e.g., filaments may be wound around a bladder or foam form), and to locate or concentrate glass/carbon/aramid/etc. fibers at desired locations to mitigate corrosion at sites known to be more susceptible to corrosion. At process block 413, the preforms is inserted or "laid up" into the molding tool. This may be a single step operation or a multistep operation. Preform preparation at block 411 may be omitted in applications using a thermoplastic base material.

With continuing reference to FIG. 5, the constituent parts of a hybrid metal-composite polymer wheel may assembled using mechanical fasteners and optional adhesives, as indicated by process blocks 415, 417 and 419, or may be assembled using overmolding and optional mechanical fasteners, as indicated by process blocks 421, 423 and 425. As per the former, process block 415 includes molding the wheel face via a suitable polymer molding process. The molding process may take on various appropriate techniques, such as high-pressure resin transfer molding (HPRTM) using a bed of dry reinforcing fibers, vacuum assisted resin transfer molding (VARTM) using a bed of dry reinforcing fibers, resin infusion molding, long-fiber injection molding, or compression molding of a prepreg fiber reinforced material. Process block 417 then includes demolding, deflashing, and machining the face of the wheel (e.g., to remove tooling marks, extraneous material, etc.). Complementary holes for mechanical fasteners may be machined into the wheel face at this time as well. At process block 419, the wheel face is joined to the barrel section of the wheel. Coated steel, stainless steel, or titanium screws (or other suitable material), self-aligning bolts, tapered pins, grommets, or other functional mechanical fasteners may rigidly secure the face to the barrel. As indicated above, a suitable metal-to-polymer adhesive may be used to provide a more durable joint. In general, care will be taken to ensure that each spoke of the face is evenly tightened to the barrel, e.g., optimize an even distribution of loading forces across the face. As yet a further option, square holes and lag bolts may be used to secure the face from inside the well (e.g., air space of the tire) to provide a "cleaner" appearance.

For applications in which it is desired to overmold the wheel face onto the barrel, the method 400 transitions from process block 413 to process block 421 and concurrently forms the wheel face while joining the face to the barrel. Similar to process block 415, the wheel face is formed at block 421 via a suitable polymer molding process, including those described above. In this instance, however, the powder coated barrel is inserted into the mold tool, the preform/ prepreg placed into the mold and properly aligned with the barrel, and the molding commenced. In instances in which a carbon fiber preform is used with thermosetting polymer matrix, it may be desirable to use an HPRTM process for overmolding the wheel face onto the barrel. The reinforcement fibers for the spoke sections of the face may be strategically arranged in such a way that they pass through the dedicated overmold through holes and/or inset tab holes and return into the spoke. For at least some applications, this is performed for about 10-25% (or more) of the fiber reinforcement of the spoke. In so doing, when the fiber bed is placed into the molding tool and the resin is flowed through the fiber bed, the fibers embedded in the overmold through holes/tabs are incorporated into the composite and hold the wheel face in place with respect to the barrel, thereby locking the barrel in place.

After closing the mold tool and forming the wheel face onto the barrel at process block 421, the wheel face is allowed to cure at process block 423 and is thereafter demolded and deflashed at process block 425. For at least some embodiments, the FRP material contains a carbon fiber volume concentration of between about 40 and about 70 volume percent or, alternatively, between about 50 and about 65 volume percent. It is envisioned that the FRP material employs thermosetting polymer resins, such as epoxy, urethane, bismaleimide, thermosetting dicyclopentadiene, crosslinking isocyanurate, etc. Alternatively, the FRP material may employ thermoplastic resins, such as polyamides, aromatic polyamides, polyetherimides, poly(p-phenylene ethers), etc. Optionally, metallic segments may be added for the lug seats and backing plate for interfacing with the vehicle's hub-and-bearing assembly. At process block 427, the entire wheel unit is clear coated and, at process block 429, a final inspection is performed prior to shipping the product or installing it on a vehicle. During final inspection, each wheel unit may be examined to ensure, for example, acceptable appearance, fasteners were not missed during assembly, etc.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A wheel for a wheel assembly of a motor vehicle, the wheel assembly including a tire, and the motor vehicle including a vehicle body, the wheel comprising:
a wheel face with a central hub, an annular spoke rim circumscribing the central hub, and multiple spokes circumferentially spaced about and projecting radially outward from the central hub, the spokes extending between and connecting the annular spoke rim and the central hub, the central hub being configured to rotatably attach to the vehicle body, and the wheel face, including the central hub, the annular spoke rim, and the spokes, being fabricated as a single-piece structure from a fiber-reinforced polymer (FRP) material; and
a wheel barrel circumscribing the wheel face and including an annular rim configured to mount thereon the tire, the wheel barrel being fabricated from a metallic material and including a series of overmold through holes circumferentially spaced about and extending through the annular rim, wherein the FRP material extends through the overmold through holes and thereby mounts the wheel face to the wheel barrel,
wherein the annular rim includes a rim well with rim flanges projecting radially outwards from opposing edges of the rim well, and wherein the FRP material of the wheel face forms integral rivets and/or integral backing plates each abutting the rim well of the annular rim.

2. The wheel of claim 1, wherein the FRP material of the wheel face forms the integral rivets, each of the integral rivets having a mushroom shape and seating within a respective one of the overmold through holes.

3. The wheel of claim 1, wherein the spoke rim is coaxial with the wheel barrel and seats substantially flush against a radially inner surface of the annular rim.

4. The wheel of claim 1, wherein the overmold through holes extend through at least one of the rim flanges projecting radially outward from the rim well of the annular rim.

5. The wheel of claim 1, wherein the FRP material of the wheel face forms the integral backing plates, each of the integral backing plates seating against the rim well of the annular rim and covering a respective one of the overmold through holes.

6. The wheel of claim 1, wherein the FRP material of the wheel face forms the integral rivets, each of the integral rivets abutting the rim well of the annular rim and covering a respective one of the overmold through holes.

7. The wheel of claim 1, wherein at least about 10% to about 25% of fibers contained within the FRP material of the wheel face is located inside the rim well.

8. The wheel of claim 1, wherein the metallic material includes aluminum, steel, magnesium, titanium, alloys thereof, and/or combinations thereof, and wherein the FRP material includes glass, carbon, aramid, boron, metal, and/or basalt fibers embedded within a thermoset or thermoplastic polymer matrix.

9. The wheel of claim 1, wherein the wheel barrel, including the annular rim, is fabricated entirely from the metallic material as a single-piece wheel barrel structure.

10. The wheel of claim 1, further comprising multiple mechanical fasteners circumferentially spaced about the annular rim and mounting the spokes of the wheel face to the wheel barrel.

11. A motor vehicle, comprising:
a vehicle body with a wheel well; and
a wheel assembly located at least partially within the wheel well, the wheel assembly including:
an inflatable tire;
a wheel face with a central hub, an annular spoke rim circumscribing and coaxial with the central hub, and multiple spokes circumferentially spaced about and projecting radially outward from the central hub, the spokes extending between and connecting the annular spoke rim and the central hub, the central hub being rotatably attached to the vehicle body, and the wheel face, including the central hub, the annular spoke rim, and the spokes, being fabricated as a single-piece structure from a fiber-reinforced polymer (FRP) material; and
a wheel barrel circumscribing and coaxial with the wheel face, the wheel barrel including an annular rim mounting thereon the inflatable tire, the wheel barrel being fabricated from a metallic material and including a series of overmold through holes circumferentially spaced about and extending through the annular rim, wherein the FRP material of the spokes and annular spoke rim extends through the overmold through holes of the annular rim and thereby mounts the wheel face to the wheel barrel,
wherein the annular rim includes a rim well with rim flanges projecting radially outwards from opposing edges of the rim well, and wherein the FRP material of the wheel face forms integral rivets and/or integral backing plates each abutting the rim well of the annular rim.

12. A method of manufacturing a wheel for a wheel assembly of a motor vehicle, the wheel assembly including a tire, and the motor vehicle including a vehicle body, the method comprising:
forming a wheel barrel from a metallic material, the wheel barrel including an annular rim configured to mount thereon the tire;
adding, to the wheel barrel, a series of overmold through holes circumferentially spaced about and extending through the annular rim; and
overmolding, onto the wheel barrel, a wheel face from a fiber-reinforced polymer (FRP) material such that the FRP material extends through the overmold through holes and thereby mounts the wheel face to the wheel barrel, the wheel face including a central hub, an annular spoke rim circumscribing the central hub, and multiple spokes circumferentially spaced about and projecting radially outward from the central hub, the spokes extending between and connecting the spoke rim and the central hub, the central hub being configured to rotatably attach to the vehicle body, wherein the wheel face, including the central hub, the spoke rim, and the spokes, is fabricated as a single-piece structure from the FRP material, wherein the annular rim includes a rim well with rim flanges projecting radially outwards from opposing edges of the rim well, and wherein the FRP material of the wheel face forms integral rivets and/or integral backing plates each abutting the rim well of the annular rim.

13. The method of claim 12, wherein the FRP material of the wheel face forms the integral rivets, each of the integral rivets having a mushroom shape and seating within a respective one of the overmold through holes.

14. The method of claim 12, wherein each of the overmold through holes receives therethrough the FRP material of and is aligned with a respective one of the spokes of the wheel face.

15. The method of claim 12, wherein the wheel face, including the spokes, the annular spoke rim, and central hub, is formed via a high-pressure resin transfer molding (RTM) process entirely from the FRP material, and wherein the wheel barrel, including the annular rim, is formed via a forging and flow-forming process entirely from the metallic material as a single-piece wheel barrel structure.

16. The method of claim 12, wherein the spoke rim is coaxial with the wheel barrel and seats substantially flush against a radially inner surface of the annular rim.

17. The method of claim 12, wherein the FRP material of the wheel face forms the integral backing plates each seated against the rim well of the annular rim and covering a respective one of the overmold through holes.

18. The method of claim 12, wherein the FRP material of the wheel face forms the integral rivets each abutting the rim well of the annular rim and covering a respective one of the overmold through holes.

19. The method of claim 12, wherein the annular rim includes a rim well with rim flanges projecting from opposing edges of the rim well, and wherein at least about 10% to about 25% of fibers contained within the FRP material of the wheel face is located inside the rim well.

20. The method of claim 12, wherein the metallic material includes aluminum, steel, magnesium, titanium, alloys thereof, and/or combinations thereof, and wherein the FRP material includes glass, carbon, aramid, boron, metal, and/or basalt fibers embedded within a thermoset or thermoplastic polymer matrix.

* * * * *